(12) United States Patent
Bracker

(10) Patent No.: US 10,338,552 B2
(45) Date of Patent: Jul. 2, 2019

(54) SIMULATION APPARATUS AND METHOD FOR SIMULATING A PERIPHERAL CIRCUIT ARRANGEMENT THAT CAN BE CONNECTED TO A REGULATING DEVICE

(71) Applicant: dSPACE digital signal processing and control engineering GmbH, Paderborn (DE)

(72) Inventor: Joerg Bracker, Delbrueck (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 283 days.

(21) Appl. No.: 15/433,236

(22) Filed: Feb. 15, 2017

(65) Prior Publication Data

US 2017/0160708 A1 Jun. 8, 2017

Related U.S. Application Data

(63) Continuation of application No. PCT/EP2015/065533, filed on Jul. 8, 2015.

(30) Foreign Application Priority Data

Aug. 15, 2014 (DE) .......................... 10 2014 111 675

(51) Int. Cl.
*G05B 17/02* (2006.01)
*H02M 3/155* (2006.01)

(52) U.S. Cl.
CPC ............ *G05B 17/02* (2013.01); *H02M 3/155* (2013.01); *G05B 2219/23446* (2013.01)

(58) Field of Classification Search
CPC ............................... G05B 17/02; H02M 3/155
See application file for complete search history.

(56) References Cited

U.S. PATENT DOCUMENTS 5,677,634 A * 10/1997 Cooke ................. G01R 31/028
324/519
8,400,179 B1 * 3/2013 Hulbert ............ G01R 31/31924
324/750.3
(Continued)

FOREIGN PATENT DOCUMENTS

DE 10 2007 048 770 A1 4/2009
JP 2000035380 A 2/2000
(Continued)

OTHER PUBLICATIONS

German Search Report for German Application No. 10 2014 111 675.5 dated Jan. 20, 2016 with English translation.
(Continued)

*Primary Examiner* — Vincent H Tran
(74) *Attorney, Agent, or Firm* — Muncy, Geissler, Olds & Lowe, P.C.

(57) ABSTRACT

A simulation apparatus for simulating a peripheral circuit arrangement connected to a regulating device and has a first current controller for influencing a first load current and a second current controller for influencing a first source current. The first current controller is controlled by a model code and used to set the first load current, and the first load current is routed to a first load connection of the regulating device. The second current controller is controlled by the model code and used to set the first source current, which is routed to a first supply connection of the regulating device. The model code influences the model code on the first current controller and the second current controller allows the first load current to be recovered at least proportionally from the first source current and/or the first source current to be recovered at least proportionally from the first load current.

18 Claims, 3 Drawing Sheets

(56) References Cited

U.S. PATENT DOCUMENTS

| | | | |
|---|---|---|---|
| 8,768,675 B2 | 7/2014 | Bracker et al. | |
| 2004/0119460 A1* | 6/2004 | Benes | G01R 19/0092 324/76.11 |
| 2006/0066343 A1* | 3/2006 | Tanida | G01R 31/2844 324/762.01 |
| 2006/0113845 A1* | 6/2006 | Berger | G01R 31/31924 307/151 |
| 2007/0257696 A1* | 11/2007 | Eldridge | G01R 31/31721 324/762.01 |
| 2008/0270090 A1* | 10/2008 | Bracker | G05F 1/625 703/4 |
| 2010/0039120 A1* | 2/2010 | Plude | G05B 17/02 324/555 |
| 2010/0259274 A1* | 10/2010 | Liu | G01R 31/34 324/502 |
| 2012/0105072 A1* | 5/2012 | Peterson | G01R 31/42 324/511 |
| 2014/0222212 A1* | 8/2014 | Anderson | G05B 23/0205 700/275 |

FOREIGN PATENT DOCUMENTS

| | | |
|---|---|---|
| JP | 2003153546 A | 5/2003 |
| JP | 2008092676 A | 4/2008 |
| JP | 2011004568 A | 1/2011 |
| WO | WO 2007/042228 A1 | 4/2007 |

OTHER PUBLICATIONS

Wagener et al., "Hardware-in-the-Loop Test Systems for Electric Motors in Advanced Powertrain Applications," SAE Technical Paper 2007-01-0498, pp. 1-14 (2007).

DSPACE, Embedded Success Catalog 2014, pp. 1, 282-311 and 472-491 (2014).

Japanese Office Action issued by the Japanese Patent Office dated Feb. 21, 2019 in corresponding application 2017-508604.

* cited by examiner

SIMULATION APPARATUS AND METHOD FOR SIMULATING A PERIPHERAL CIRCUIT ARRANGEMENT THAT CAN BE CONNECTED TO A REGULATING DEVICE

This nonprovisional application is a continuation of International Application No. PCT/EP2015/065533, which was filed on Jul. 8, 2015, and which claims priority to German Patent Application No. 10 2014 111 675.5, which was filed in Germany on Aug. 15, 2014, and which are both herein incorporated by reference.

BACKGROUND OF THE INVENTION

Field of the Invention

The invention relates to a simulation apparatus for simulating a peripheral circuit arrangement that can be connected to a regulating device and to a method for simulating a peripheral circuit arrangement that can be connected to a regulating device.

Description of the Background Art

Simulation apparatuses and a selection of hardware components for the simulation apparatuses are known from the printed product catalog "Catalog 2014 Embedded Success dSPACE" on pages 282 to 311 and pages 472 to 491.

Professionals in the field of regulating device development are familiar with the use of a simulation apparatus for simulating a peripheral circuit arrangement that are connected to regulating device(s). Moreover, the use of simulated electrical loads for testing control devices or regulating devices is known. For example, various practical examples of HIL simulators are listed in an SAE scientific paper by A. Wagener et al. from the year 2007 with the title "Hardware-in-the-Loop Test Systems for Electric Motors in Advanced Powertrain Applications." The circuit complexity in the HIL simulators and/or the conversion effort when changing the regulating device under test (abbreviated as DUT) is/are high.

Alternatively, regulating devices can also be called control devices.

The purpose of a simulation apparatus of the aforementioned type in particular is to test the regulating device for its functionality, without the regulating device having to be brought into its "real" working environment. A realistic simulation of the "real" working environment of the regulating device is a prerequisite for being able to detect at an early stage problems and errors, arising, for example, during the development or modification of the regulating device, in the testing of the regulating device. The intent of the tests, carried out with the simulation apparatus is, for example, to check the power electronic interfaces of the regulating devices. The regulating devices are often called DUT (device under test) in the technical context described above. A frequent goal is to check whether the regulating device or the DUT reacts in the desired manner, whether therefore the regulating device reacts to specific state variables, received via its interfaces, with a suitable output of output variables that are output via its interfaces. The communication of the regulating device with its technical environment occurs via input and output, abbreviated as I/O, in other words, by means of signals that are exchanged via the I/O interfaces between the regulating device and its technical environment.

A simulation apparatus is often used by development engineers to reproduce completely or partially the relevant technical environment of a regulating device of this kind, for example, because the "real" technical environment planned for a later time is not or not yet available to the development engineers. The simulation apparatus comprises at least one simulation computer, also called a computation unit, and at least one I/O interface.

In the case of a motor controller, for example, the motor to be controlled can be simulated totally or partially with the aid of a computation unit or a number of computation units with I/O interfaces. A mathematical copy of the motor is created first for this purpose, therefore a mathematical model and an executable model code that comprises the mathematical model and places the characteristic data and state variables of the motor in a calculable context. The mathematical model and the executable model code derived therefrom are often used as synonyms. The variables, i.e., control signals, acting on the simulated motor, from the regulating device are received by the computation unit via an I/O interface, and state variables of the copied, therefore simulated, motor are calculated on the computation unit, among others, based on the I/O signals and/or the further transmitted and/or stored information using the mathematical model. Specific state variables are typically provided to the motor controller via one or more I/O interface(s). The transmission of the state variables from the simulation apparatus to the motor controller can occur at fixed or variable time intervals or only on demand depending on the nature and purpose of the state variable.

The use of the simulation apparatus very generally results in the considerable advantage that a large spectrum of test cases can be tested and modified environments of the regulating device, e.g., different drive units, can be simulated with only little effort.

It is immediately clear that a simulation apparatus, which is set up for the cited application examples, not only receives signals in the small-signal range from a regulating device, for example, from the motor control device, but electrical large signals as well, if the regulating device has power electronic outputs, as is the case in particular during the control of electric drives. In practice, known circuits for simulating an electrical load are often operated such that the voltage at the output of the regulating device, therefore, for example, the voltage at the output of the power section of a motor controller, is measured metrologically; a corresponding motor current, which would have to flow over the controller terminal, is calculated using a mathematical model of the motor to be simulated with consideration of the motor operating data; and this setpoint current value is transmitted to the current control unit, which then adjusts the determined setpoint current as close to real time as possible by suitably controlling the circuit at the regulating device terminal.

For example, WO 2007/042228 A1, which corresponds to U.S. Pat. No. 8,768,675, which is incorporated herein by reference, describes a circuit that uses a coil as the electrical energy storage device, whose inductance is substantially lower than the inductance of the winding of an electric motor to be simulated. Controlling an electric motor typically requires a plurality of terminals because such drives with relatively high power levels are to be controlled in a multiphase, usually three-phase operation. A pulse-width modulated (PWM) voltage signal, via whose pulse duty factor, the voltage present on average over time at the terminal can be adjusted, is typically present at the controller terminal. The coil is connected by its other terminal via a half-bridge to two auxiliary voltage sources, so that, by switching the one semiconductor switch of the half-bridge, this second terminal of the coil can be connected to a high potential, and, by switching the other semiconductor switch of the bridge, the second terminal of the coil can be connected to a very low potential. It is thus possible to influence the current flow within the coil and to adjust or control the actual value of the current at the terminal of the regulating device to the value of a predefined setpoint current.

If a "semiconductor switch" is discussed in this document, then it is understood to be a switch produced by semiconductor technology, for example, a field-effect transistor, in particular, e.g., a so-called power field-effect transistor, for example, a power MOSFET (metal-oxide-semiconductor field-effect transistor), a bipolar transistor, or a so-called IGBT (insulated-gate bipolar transistor). Use of a semiconductor switch for interrupting, transmitting, and controlling a current is known.

Drive systems, for example, three-phase current motors in passenger vehicles or commercial vehicles, which have an electric or hybrid drive, often move in a power range of over 10 kW to over 100 kW. Particularly in the case of very dynamic load variations, it is necessary here to handle voltages at the regulating device terminal that are in the range of, for example, over 40 V to, for example, over 1000 V, and currents that may be in the range of a few 10 A and at peak several 100 A as well. Apart from assuring the mentioned power or voltage or current ranges at the simulation apparatus interfaces to the regulating device, a relatively low power loss in comparison with existing simulation apparatuses could be desirable, because the heat arising in known simulation apparatuses due to power loss in many application cases requires the installation of cooling units for removing the heat (loss).

Furthermore, a problem of known simulation units is their high cost, because in a line voltage connection a return feed of currents occurs out of the simulation apparatus connected to the line voltage connection, because this type of return feed is subject to strict requirements of the power supply companies. Fulfilling these requirements, in particular in relation to frequency, phase position, and voltage amplitudes of the return feed current, requires costly technical devices, the acquisition of which is normally associated with high investments.

SUMMARY OF THE INVENTION

It is therefore an object of the invention to provide a simulation apparatus and a method for simulating a peripheral circuit arrangement that can be connected to a regulating device.

According to an exemplary embodiment of the invention, a simulation apparatus is proposed for simulating a peripheral circuit arrangement that can be connected to a regulating device, wherein the simulation apparatus is or can be electrically connected to the regulating device, and the simulation apparatus has a first current controller for influencing a first load current and a second current controller for influencing a first source current, wherein the simulation apparatus furthermore comprises a computation unit and a model code that can be executed in the computation unit, and the first current controller, controllable by the model code, can be used to set the first load current and the first load current is routed to a first load connection of the regulating device, and the second current controller, controllable by the model code, can be used to set the first source current, and the first source current is routed to a first supply connection of the regulating device, and the model code is provided and set up so that by the influence of the model code on the first current controller and on the second current controller the first load current can be recovered at least proportionally from the first source current, and/or the first source current can be recovered at least proportionally from the first load current.

According to an exemplary embodiment of the invention, a method is proposed for simulating a peripheral circuit arrangement that can be connected to a regulating device, whereby the regulating device is electrically connected to a simulation apparatus for simulating the peripheral circuit arrangement, and the simulation apparatus comprises: a first current controller for influencing a first load current, flowing through a first load connection of the regulating device, a second current controller for influencing a first source current, flowing through a first supply connection of the regulating device, a computation unit, in which a model code is executed, and whereby the first load current is set by the model code and by the first current controller controlled by the model code, and the first source current is set by the model code and by the second current controller controlled by the model code, whereby the model code controls the first current controller and the second current controller in such a way that the first load current is recovered at least proportionally from the first source current, and/or the first source current is recovered at least proportionally from the first load current.

The advantage(s) of the simulation apparatus of the invention or of the method of the invention is/are that in comparison with known simulation apparatuses or in comparison with known simulation methods from the same technical field of application includes that the net energy consumption is reduced, and/or a so-called "return feed" in a line voltage connection of a public power grid is substantially prevented or at least reduced, and/or the power loss is reduced, which is particularly important because additional expenditures, for example, fans or cooling devices, the cost of which tend to increase when the power loss increases, are usually necessary to remove the heat caused by the power loss.

Further scope of applicability of the present invention will become apparent from the detailed description given hereinafter. However, it should be understood that the detailed description and specific examples, while indicating preferred embodiments of the invention, are given by way of illustration only, since various changes, combinations and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
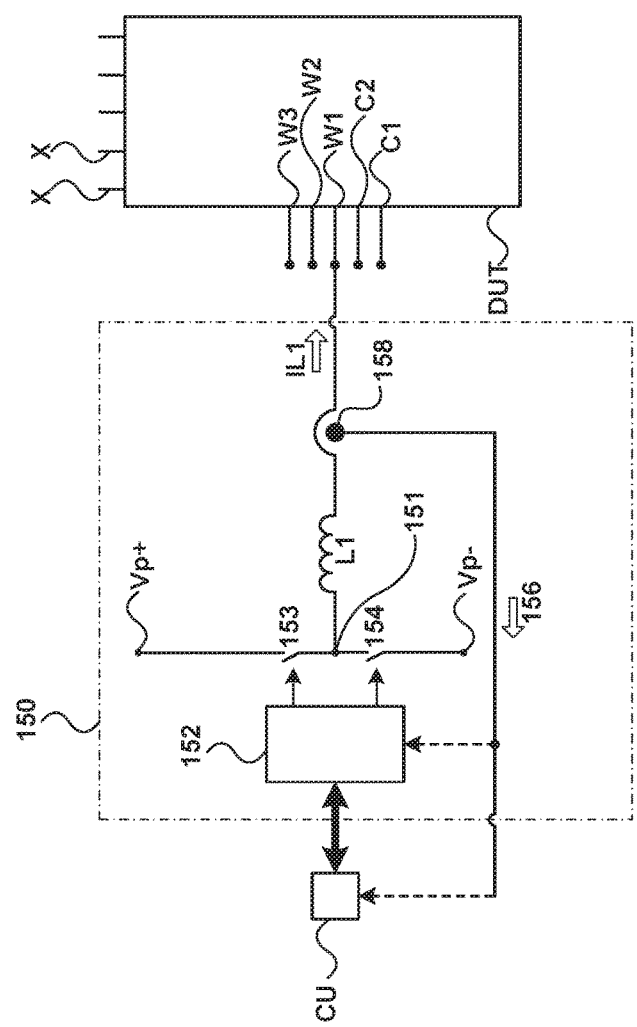
FIG. 1 shows a schematic view of an embodiment of a first current controller, whose first load current is supplied to a first load connection of a regulating device, and a schematic view of a computation unit and a regulating device, which are connected to the first current controller.
Figure 2:
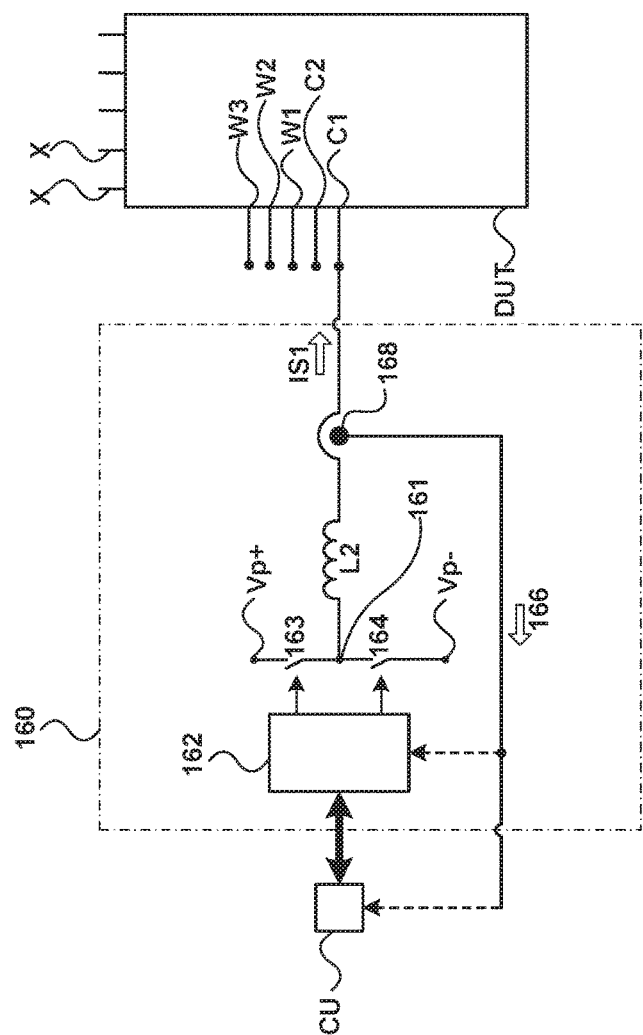
FIG. 2 shows a schematic view of an embodiment of a second current controller, whose first source current is supplied to a first supply connection of a regulating device, and a schematic view of a computation unit and a regulating device, which are connected to the second current controller.
Figure 3:
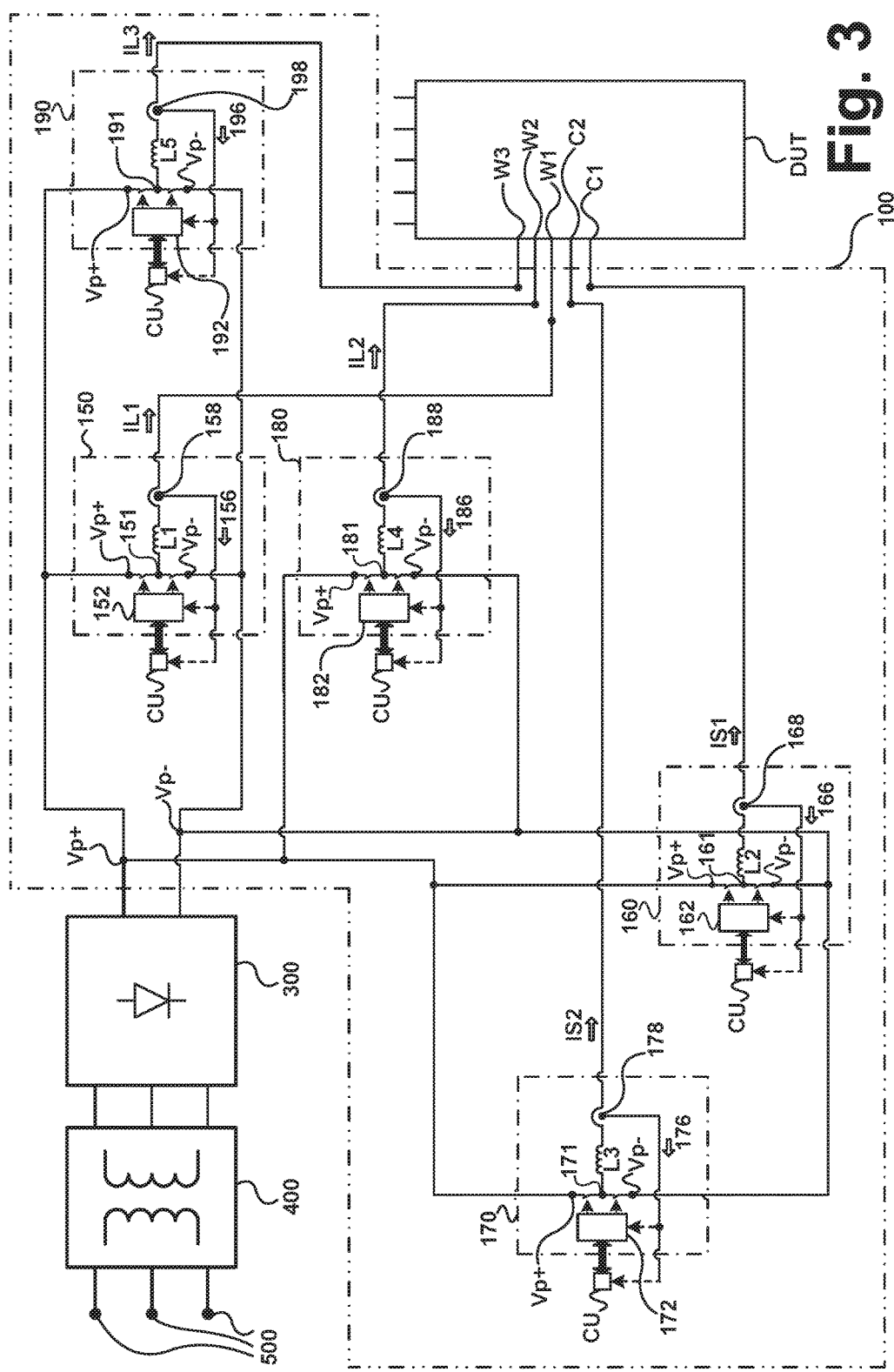
FIG. 3 shows a schematic view of an exemplary embodiment of a simulation apparatus, which simulates a three-phase electric motor and an electrochemical energy storage device, and a schematic view of a line voltage connection, a transformer, a rectifier, and a regulating device.

A simulation apparatus 100 of the invention comprises at least one current controller 150, illustrated by way of example in FIG. 1 and in FIG. 3, and a second current controller 160 illustrated by way of example in FIG. 2 and in FIG. 3. The first and second current controllers 150, 160, can be, for example a proportional-integral-derivative controller, or a current adjustment device having a switch and an inductor as illustrated in the figure, or a circuit that is configured as a controllable current source and current sink.

In addition, the simulation apparatus comprises a computation unit CU, which is located, for example, in a separate housing or "distributed" over a number of places in the simulation apparatus. The data or signals that computation unit CU outputs in particular are also understood to be signals that are used as switching signals for first current controller 150 and second current controller 160, and optionally, further current controller 170, 180, 190 for influencing the output current influenced by the respective switch controller 152, 162, 172, 182, 192, for example, for influencing first source current IS1 or for influencing first load current IL1.

In other words, the output signals of computation unit CU influence the switching behavior of first current controller 150 and of second current controller 160, and optionally of the further current controller 170, 180, 190.

The peripheral circuit arrangement, simulated by simulation apparatus 100 of the invention, is preferably a simulated copy of both an inductive load and an electrochemical energy storage device. First supply connection C1 and the further, here second, supply connection C2 of regulating device DUT in a later stage of the development process of regulating device DUT, therefore after the testing of regulating device DUT in the simulated environment has been completed, are typically electrically connected to a "real" electrochemical energy storage device, for example, a battery or an accumulator with lithium ion cells or lead accumulator cells. The "real" electrochemical energy storage device need not be discussed further in the description of the invention, however, because the subject of the invention relates to a simulation apparatus and an associated method, which replaces the "real" electrochemical energy storage device for a preceding test of regulating device DUT. A model code executable in computation unit CU and made for the described device and the described method can be assumed in the context of the present teaching, because the generation of the model code represents a routine measure for the skilled artisan. By replacing the model code in computation unit CU, simulation apparatus 100 can be adapted flexibly to predefined properties of an altered load to be simulated and/or a modified electrochemical energy storage device to be simulated. Both the already mentioned inductive load and the mentioned electrochemical energy storage device with their electrical and other properties are described by a mathematical model or by a number of, optionally interlinked, mathematical models, whose details are not the subject of the present invention, however. Models of this type, which are made in the form of the executable model code in computation unit CU, are known to the skilled artisan.

Provided the model code is configurable, therefore, designed as being particularly flexibly adaptable to different peripheral circuit arrangements to be simulated, for example, different electric motors to be simulated, a user interface can be provided by means of which the configuration data that reflect specific parameters of the particular peripheral circuit arrangement can be added to the model code. It can be provided, for example, to adapt configuration data such as the number and inductance values of the motor coils, mass moment of inertia of the rotor, etc., in the model code as soon as a new peripheral circuit arrangement is to be simulated. A further example of configuration data with which the model code can be preferably parameterized is parameters of the electrochemical energy storage device, therefore, for example, the type of energy storage cells (e.g., lead accumulator cells or lithium ion accumulator cells), the number of accumulator cells, the charge state of the accumulator cells, and/or average temperature of the accumulator cells, etc.

According to the illustration in FIG. 1, a controlled first load current IL1 is provided by a first current controller 150, and said first load current IL1 is supplied to a first load connection W1 of a regulating device DUT. A first voltage value is measured at first load connection W1 at a first measuring point 158 preferably by measuring the voltage via a measuring resistor, and a hereby determined first measured value 156 is supplied preferably directly to a computation unit CU connected to first switch controller 152 via a signal connection.

First measured value 156 particularly preferably comprises not only a measured first voltage value at first load connection W1 against a reference potential, but in addition also a measured current value of first load current IL1. It is particularly preferable, therefore, that first measuring point 158 comprises both a voltage measuring function at first load connection W1 and also a current measuring function for measuring first load current IL1.

After the metrological determination of first measured value 156 at first load connection W1 by first measuring point 158, the load to be simulated by the mathematical model code executable in the computation unit, therefore, for example, a motor winding, is therefore simulated by calculating a corresponding first load current IL1, which according to the model code would have to flow across first load connection W1 of regulating device DUT with the mathematical consideration of operational data of the "real" load, and this setpoint current value of first load current IL1 is preferably transmitted to first current controller 150. First current controller 150 then immediately provides the setpoint, calculated by the model code, of first load current IL1 by suitable activation of first semiconductor switch 153 and of second semiconductor switch 154 at first load connection of regulating device DUT. The semiconductor switches shown in the FIG. 1 and/or FIG. 2 and/or FIG. 3, namely, first semiconductor switch 153, second semiconductor switch 154, third semiconductor switch 163, fourth semiconductor switch 164, and the further semiconductor switches, shown in FIG. 3 and in each case connected in pairs to a third connection point 171, a fourth connection point 181, and a fifth connection point 191 preferably switch as a function of a pulse-width modulated voltage signal, which can be or is provided by an assigned switch controller. Described more precisely, in the shown embodiments according to FIGS. 1, 2, and 3 in each case a switch controller controls two associated semiconductor switches, namely: first switch controller 152 controls first semiconductor switch 153 and second semiconductor switch 154.

Second switch controller 162 controls third semiconductor switch 163 and fourth semiconductor switch 164.

Third switch controller 172 controls the two illustrated semiconductor switches, which are connected to third connection point 171. Fourth switch controller 182 controls the two illustrated semiconductor switches, which are connected to fourth connection point 181. Fifth switch controller 192 controls the two illustrated semiconductor switches, which are connected to fifth connection point 171.

The signal connection between computation unit CU and first switch controller 152 is symbolized in each case using a double arrow in FIG. 1 and in FIG. 3. In principle, a unidirectional signal connection from computation unit CU to first switch controller 152 is sufficient. Optionally, however, a bidirectional signal connection can be provided between computation unit CU and first switch controller 152, for example, in an embodiment variant of first current controller 150, in which first measured value 156 is first routed to first switch controller 152 and then, for example, first measured value 156 is transmitted via a signal connection from first switch controller 152 to computation unit CU.

The model code executed on computation unit CU preferably calculates a first setpoint for influencing first current controller 150 in each time step, which is particularly preferably a model sampling interval, with a preferably predefined maximum duration based on the cyclically updated first measured value 156, whereby said influencing preferably occurs by converting the first setpoint either by computation unit CU or by first switch controller 152 cyclically into switching signals for activating first semiconductor switch 153 and second semiconductor switch 154.

In the technical field of numerical simulation, the length of a time step, in which the model code, for example, processes at least one first measured value or at least one first sensor value and based on the first measured value or first sensor value directly within said time step, at least one setpoint for influencing at least one physical parameter to be regulated is calculated and provided, is often called a "model sampling interval." For example, model sampling intervals of only a few microseconds are typical in the numerical simulation. In the context of this invention, the term "sampling" by a model code is therefore to be interpreted in the sense of a "cyclic processing of signals/data" by the model code, whereby at least one measured value or sensor value is processed by the model code in each model sampling interval and an associated setpoint is calculated by the model code in each model sampling interval.

At first connection point 151 of first semiconductor switch 153 and second semiconductor switch 154 as shown in FIG. 1, depending on the switch position of these two semiconductor switches 153, 154 a potential can be set that is within a value range from a positive supply voltage Vp+ to a negative supply voltage Vp−. Whether the positive value range limit of the potential at first connection point 151, namely, the positive supply voltage Vp+, and whether the negative value range limit of the potential at first connection point 151, namely, the negative supply voltage Vp−, can be set depends on a negligibility of the internal resistances of one of these two semiconductor switches 153, 154 in the state of a maximum established conductivity and on an influencing of the potential at first connection point 151 by the potential at a first load connection W1 of regulating device DUT. It is irrelevant for the ability to execute the invention, however, whether the positive or negative value range limit of the potential can always be achieved at first connection point 151, because reaching these two value range limits is not necessary for a realistic simulation of the environment of regulating device DUT.

In principle, first measured value 156 can be transmitted directly to first switch controller 152 and from here to computation unit CU. Preferably, however, first measured value 156 can be transmitted to computation unit CU and a first setpoint, calculated from the first measured value by the model code, via computation unit CU, optionally in a converted signal format, to first switch controller 152. The alternatives, mentioned in this paragraph, for "relaying" the first measured value are symbolized in FIG. 1 using the two dashed arrows leading to computation unit CU or to first switch controller 152.

First switch controller 152 preferably controls both a first semiconductor switch 153, with which a connection can be made from a positive supply voltage Vp+ to first load connection W1, and also a second semiconductor switch 154, with which a connection can be made from a negative supply voltage Vp− to first load connection W1. It is self-evident that first semiconductor switch 153 and second semiconductor switch 154 need not be simultaneously in a state of maximum conductivity, because otherwise there would be a short circuit from the positive supply voltage Vp+ to the negative supply voltage Vp−.

First switch controller 152 is preferably configured such that first semiconductor switch 153 is placed in the conductive state by first switch controller 152, only if beforehand or simultaneously second semiconductor switch 154 was or is placed in the blocking state by first switch controller 152. Similarly, first switch controller 152 is preferably configured such that second semiconductor switch 154 is placed in the conductive state by first switch controller 152, only if beforehand or simultaneously first semiconductor switch 153 was or is placed in the blocking state by first switch controller 152.

Possible, relatively small leakage currents, which despite a blocking state of first semiconductor switch 153 and/or second semiconductor switch 154 can flow through the respective blocked semiconductor switch 153, 154, will not be discussed further in the context of the present description, because this is not necessary for understanding the invention.

The computational preparation of the switching processes at first semiconductor switch 153 and second semiconductor switch 154 can occur in principal "distributed" to a number of computation units (distributed computing), for example, partially in computation unit CU and partially in first switch controller 152, whereby this example requires that a processor for suitable further processing of the signals of computation unit CU is set up in first switch controller 152.

Depending on the position of first semiconductor switch 153 and second semiconductor switch 154, the current direction of first load current IL1 is directed either toward first load connection W1 or away from first load connection W1. Naturally, in addition, a case can occur that there is no potential gradient between first load connection W1 and first connection point 151, which naturally will lead to an interruption of first load current IL1.

The model code executed in computation unit CU in conjunction with first switch controller 152 and its associated first semiconductor switch 153 and second semiconductor switch 154 makes sure that first load current IL1 provided according to the model code is impressed in the current direction, provided by the model code, on first load connection W1 of regulating device under test DUT.

Preferably, while the simulation is running at predefined time intervals, particularly preferably during each model sampling interval, a first measured value 156, which preferably represents both a measured amount and a measured polarity, is provided at first measuring point 158 whereby first measured value 156 is processed by the model code.

The reference potential in particular for the voltage measurement at first measuring point 158 is preferably a ground potential, particularly preferably a "common ground potential."

A reference potential terminal, although not shown in the figures, is present in the described embodiments of the invention.

The "common ground potential" is to be understood as a ground potential that is to be regarded as a substantially identical reference potential for all load connections W1, W2, W3 and all supply connections C1, C2 of regulating device DUT. In other words, if a common ground potential is present, the electrical voltages at first load connection W1 and all other load connections W2, W3 and at first supply connection C1 and the further supply connection C2 are characterized by a potential difference to the common ground potential.

In principle, different loads, in particular inductive loads, can be connected at first load connection W1 or at load connections W1, W2, W3 of regulating device under test DUT depending on the predefined intended purpose of regulating device DUT. Similarly, one or more different electrochemical energy storage devices can be connected at first supply connection C1 or at both supply connections C1 and C2, shown in FIGS. 1 to 3, of regulating device DUT. By means of simulation apparatus 100 of the invention, the user is therefore enabled to simulate a plurality of different loads and different electrochemical energy storage devices, in particular the aforementioned inductive loads, the batteries or accumulators. A change in the parameterization and/or an adaptation of the simulation model or of the model code can be advantageous or necessary for this; this need not be discussed in the context of the present invention, however, because generation, adaptation, and/or parameterization of the simulation model or of the model code are familiar to the skilled artisan in the relevant technical field.

The regulating device under test DUT preferably has further connections X, apart from supply connections C1, C2 and load connections W1, W2, W3. Load connections W1, W2, W3 of regulating device DUT are preferably set up to be connected to a connection of an electric motor winding during later use. In the context of the simulation, first load connection W1 is connected to first current controller 150 in such a way that a current IL1, depending on the position of first semiconductor switch 153 and of second semiconductor switch 154, flows either from first load connection W1 to first current controller 150 or from first current controller 150 to first load connection W1.

The further connections X of regulating device DUT preferably comprise input/inputs for sensor signals and/or interface(s) for networking such as, for example, a CAN bus and/or FlexRay and/or Ethernet interface and/or connection/connections for a reference potential and/or analog signal output/signal outputs and/or input/inputs for operating voltage(s) and/or output/outputs for operating voltage(s) and/or interface(s) for diagnostic device(s), whereby this list of further connections X is only provided as an example.

Preferably, a first coil L1 is disposed between first connection point 151 and first load connection W1.

First load current IL1 of first current controller 150 is routed proceeding from first connection point 151 to regulating device DUT and consequently is also influenced by first coil L1, in particular by the inductance thereof preferably relative to the associated current-voltage characteristic {IL1=f(voltage at first connection point 151–voltage at first load connection W1)}. It is not necessary to discuss in greater detail the time dependencies of the current-voltage value pair, because said dependencies in variable currents in coils are familiar to the skilled artisan.

Depending on the employed switching frequencies of first semiconductor switch 153 and second semiconductor switch 154, a line inductance of a connecting line between first connection point 151 and first load connection W1 is to be taken into account, for example, in the model code, in addition to the inductance of first coil L1 or alternatively if, e.g., first current controller 150 does not comprise a first coil L1.

The determined first measured value 156 is preferably supplied directly to computation unit CU.

Alternatively, for example, it can be provided that the information, contained in first measured value 156 of first current controller 150, is transmitted "distributed"; therefore, for example, a measured voltage value at first load connection W1 is transmitted directly to computation unit CU and a measured current value of first load current IL1 is transmitted to first switch controller 152.

This last example is advantageous, if first switch controller 152 has an appropriate information processor, so as to influence first load current IL1 based on the measured first load current IL1 and the information transmitted from computation unit CU to first switch controller 152.

A preferred embodiment of simulation apparatus 100 having a particularly preferred provision of the positive supply voltage Vp+ and the negative supply voltage Vp− will be described in greater detail in the description of FIG. 3.

According to the illustration in FIG. 2, a controlled first source current IS1 is provided by a second current controller 160, and this first source current IS1 is supplied to a first supply connection C1 of regulating device DUT.

At a second measuring point 168, a voltage is measured at first supply connection C1 measured preferably by a voltage measurement using a measuring resistor (not shown in FIG. 2) and a second measured value 166 is determined. Second measured value 166 particularly preferably comprises not only a measured voltage value at first supply connection C1 against a reference potential, but in addition also a measured current value of first source current IS1. It is particularly preferable, therefore, that second measuring point 168 comprises both a voltage measuring function at first supply connection C1 and also a current measuring function for measuring first source current IS1.

The determined second measured value 166 is preferably supplied directly to computation unit CU.

Alternatively, for example, it can be provided that the information, contained in second measured value 166 of second current controller 160, is transmitted "distributed"; therefore, for example, a measured voltage value at first supply connection C1 is transmitted directly to computation unit CU and a measured current value of first source current IS1 is transmitted to second switch controller 162.

This last example is advantageous, if second switch controller 162 has an appropriate information processor, so as to influence first source current IS1 based on the measured first source current IS1 and the information transmitted from computation unit CU to second switch controller 162.

Preferably, a second coil L2 is placed between a second connection point 161 and first supply connection C1.

First source current IS1 of second current controller 160 is routed to regulating device DUT proceeding from second connection point 161 and consequently the current-voltage characteristic associated with first source current IS1 {S1=f (voltage at second connection point 161–voltage at first supply connection C1)} is also influenced by second coil L2, particularly the inductance thereof. It is not necessary to discuss in greater detail the time dependencies of the current-voltage value pair, because said dependencies in variable currents in coils are familiar to the skilled artisan. Depending on the employed switching frequencies of third semiconductor switch 163 and fourth semiconductor switch 164, a line inductance of a connecting line between second connection point 161 and first supply connection C1 is to be taken into account, for example, in the model code, in addition to the inductance of second coil L2 or alternatively if, e.g., second current controller 160 does not comprise a second coil L2.

After the metrological determination of the voltage at first supply connection C1 by second measuring point 168, preferably an electrochemical energy storage device to be simulated, therefore, for example, an accumulator or battery, is therefore simulated by means of the mathematical model code, executable on computation unit CU, by calculating a corresponding first source current IS1, which according to the model code would have to flow over first supply connection C1 of regulating device DUT with the mathematical consideration of operational data of the "real" electrochemical energy storage device, and this setpoint current value of first source current IS1 is transmitted preferably to second current controller 160. Second current controller 160 then immediately sets the setpoint of first source current IS1 as calculated by the model code, by a suitable activation of third semiconductor switch 163 and fourth semiconductor switch 164 at first supply connection C1 of regulating device DUT.

The signal connection between computation unit CU and second switch controller 162 is symbolized in FIG. 2 and in FIG. 3 in each case using a double arrow. In principle, a unidirectional signal connection from computation unit CU to second switch controller 162 is sufficient.

Optionally, however, a bidirectional signal connection can be provided between computation unit CU and second switch controller 162, for example, in an embodiment variant of second current controller 160, in which second measured value 166 is routed further first to second switch controller 162 and then, for example, second measured value 166 is transmitted via a signal connection from second switch controller 162 to computation unit CU.

The model code executed on computation unit CU preferably calculates a second setpoint for influencing second current controller 160 in each time step, which is particularly preferably a model sampling interval, with a preferably predefined maximum duration based on the cyclically updated second measured value 166, whereby said influencing preferably occurs in that the second setpoint is converted either by computation unit CU or by second switch controller 162 cyclically into switching signals for activating third semiconductor switch 163 and fourth semiconductor switch 164.

At second connection point 161 of third semiconductor switch 163 and fourth semiconductor switch 164 as shown in FIG. 2, depending on the switch position of these two semiconductor switches 163, 164 a potential can be set that is within a value range from the positive supply voltage Vp+ to the negative supply voltage Vp–. Whether the positive value range limit of the potential can be set at second connection point 161, namely, the positive supply voltage Vp+, and whether the negative value range limit of the potential can be set at second connection point 161, namely, the negative supply voltage Vp–, depends, of course, on a negligibility of the internal resistances of one of these two semiconductor switches 163, 164, shown in FIG. 2, in the state of a set maximum conductivity and on an influencing of the potential at second connection point 161 by the potential at a first supply connection C1 of regulating device DUT. It is irrelevant whether the positive or negative value range limit of the potential at second connection point 161 can always be achieved, because reaching these two value range limits is not necessary for a realistic simulation of the environment of regulating device DUT.

In principle, second measured value 166 can be transmitted directly to second switch controller 162 and from here to computation unit CU. Preferably, however, second measured value 166 can be transmitted to computation unit CU and a second setpoint calculated from the second measured value by the model code via computation unit CU, optionally in a converted signal format, to second switch controller 162. The alternatives, mentioned in this paragraph, for "relaying" the second measured value are symbolized in FIG. 2 using the two dashed arrows leading to computation unit CU or to second switch controller 162.

Second switch controller 162 preferably controls both a third semiconductor switch 163, with which a connection from a positive supply voltage Vp+ to first supply connection C1 can be made, and also a fourth semiconductor switch 164, with which a connection from a negative supply voltage Vp– to first supply connection C1 can be made. It is self-evident that third semiconductor switch 163 and fourth semiconductor switch 164 need not be simultaneously in a state of maximum conductivity, because otherwise there would be a short circuit from the positive supply voltage Vp+ to the negative supply voltage Vp–.

Second switch controller 162 is preferably configured such that third semiconductor switch 163 is placed in the conductive state by second switch controller 162, only if beforehand or simultaneously fourth semiconductor switch 164 was or is placed in the blocking state by second switch controller 162. Similarly, second switch controller 162 is preferably configured such that fourth semiconductor switch 164 is placed in the conductive state by second switch controller 162, only if beforehand or simultaneously third semiconductor switch 163 was or is placed in the blocking state by second switch controller 162.

Possible, relatively small leakage currents, which despite a blocking state of third semiconductor switch 163 and/or fourth semiconductor switch 164 can flow through the blocked semiconductor switches 163, 164, will not be discussed further in the context of the present description, because this is not necessary for understanding the invention.

The computational preparation of the switching processes at third semiconductor switch 163 and fourth semiconductor switch 164 can occur in principal "distributed" to a number of computation units (distributed computing), for example, partially in computation unit CU and partially in second switch controller 162, whereby this example assumes that a processor for suitable further processing of the signals of computation unit CU is set up in second switch controller 162.

Depending on the position of third semiconductor switch 163 and fourth semiconductor switch 164, the current direction of first source current IS1 is directed either toward first supply connection C1 or away from first supply connection C1. Naturally, in addition, a case can occur that there is no potential gradient between first supply connection C1 and second connection point 161, which naturally will lead to an interruption of first source current IS1.

The model code executed on computation unit CU in conjunction with second switch controller 162 and its associated third semiconductor switch 163 and fourth semiconductor switch 164 makes sure that first source current IS1, provided according to model code, is impressed in the current direction, provided by the model code, on first supply connection C1 of regulating device under test DUT.

Preferably, while the simulation is running at predefined time intervals, particularly preferably during each model sampling interval, a second measured value 166, which preferably represents both a measured amount and a measured polarity, is provided at second measuring point 168. Preferably, second measured value 166 is a second voltage measured value, and therefore represents the voltage and the polarity at second measuring point 168 against a reference potential.

The reference potential in particular for the voltage measurement at second measuring point 168 is preferably a ground potential, particularly preferably a "common ground potential."

Preferably, a second coil L2 is placed between second connection point 161 and first supply connection C1.

Apart from regulating device DUT, first current controller 150 and second current controller 160, and computation unit CU, additional further current controller, namely, third current controller 170, fourth current controller 180, and fifth current controller 190 are shown schematically in FIG. 3. Preferably, all current controller 150, 160, 170, 180, 190 have an identical structure. The exemplary embodiment of a simulation apparatus 100, as shown in FIG. 3, comprises on the one hand, three current controller 150, 180, 190, each of which is connected to one of three load connections W1, W2, W3 of regulating device DUT, and on the other hand, two current controllers 160, 170, each of which is connected to one of supply connections C1, C2 of regulating device DUT.

The overall five current controller 150, 160, 170, 180, 190 of FIG. 3, each of which are shown bordered by a dashed-dotted line, together with computation unit CU, the connections for the positive supply voltage Vp+ and for the negative supply voltage Vp−, and the electrical connecting lines represent components of the illustrated preferred embodiment of simulation apparatus 100, whereby this embodiment is shown bordered by a double-dot dashed line (..-..-).

It is evident that associated setpoints are provided basically by the model code for each current controller 150, 160, 170, 180, 190. The model code therefore comprises computation instructions for controlling individually each current controller 150, 160, 170, 180, 190. Preferably, the setpoints are updated for each current controller 150, 160, 170, 180, 190 over the course of the simulation in each model sampling interval by the model code.

Preferably, first supply connection C1 and/or the further supply connection C2 is/are each acted upon by a capacitor, for example, by a connected capacitor. This capacitor or these capacitors slow down voltage changes at first supply connection C1 and/or at the further supply connection C2. Optionally, it can be provided in addition that first load connection W1 and/or the further, here second, load connection W2 and/or the further, here third, load connection W3 are acted upon by a capacitor, for example, by a connected capacitor, which causes a delay in the voltage changes at first load connection W1 and/or at the further, here second, load connection W2 and/or at the further, here third, load connection W3. The capacitors mentioned in this paragraph contribute to a "decoupling" of the associated connections of the regulating device.

FIG. 3 shows in addition a schematic view of a network voltage connection 500, a transformer 400, and a rectifier. It should be noted that despite the described current recovery by the invention, no "loss-free" energy cycles can be achieved during the simulation. Consequently, during the operation of the simulation apparatus in particular for compensation of the energy losses arising within the simulation apparatus, an external energy supply must be assured, for example, via line voltage connection 500, whose voltage is transformed first by a transformer 400 and then converted by a rectifier 300 to a direct voltage. Rectifier 300 provides at its output a positive supply voltage Vp+ and a negative supply voltage Vp− for simulation apparatus 100.

It should be noted at this point that the positive supply voltage Vp+ and the negative supply voltage Vp− can also be provided in principle in another way, for example, by accumulators.

If, as illustrated in the exemplary embodiment according to FIG. 3, a three-phase motor designed for a three-phase operation, having three winding connections, is to be simulated by simulation apparatus 100, then for the purposes of simulation preferably instead of the "real" winding connections of the three-phase motor in each case a current controller 150, 180, 190 per simulated winding connection is connected in each case to one load connection W1, W2, W3 of regulating device DUT. In order to explain this exemplary embodiment somewhat more graphically, the following connections in particular are provided in FIG. 3.

First load connection W1 of regulating device DUT, which is to be connected preferably in the later provided "real" use of regulating device DUT to a first winding connection of the three-phase motor, for the purposes of simulation is connected instead to first current controller 150 in such a way that first load current IL1 can flow between first load connection W1 and first connection point 151.

Second load connection W2 of regulating device DUT, which is to be connected preferably in the later provided "real" use of regulating device DUT to a second winding connection of the three-phase motor, for the purposes of simulation is connected instead to the further, here fourth, current controller 180 in such a way that second load current IL2 can flow between second load connection W2 and fourth connection point 181.

Third load connection W3 of regulating device DUT, which is to be connected preferably in the later provided "real" use of regulating device DUT to a third winding connection of the three-phase motor, for the purposes of simulation is connected instead to the further, here fifth, current controller 190 in such a way that third load current IL3 can flow between third load connection W3 and fifth connection point 191.

First supply connection C1 of regulating device DUT, which is to be connected preferably in the later provided "real" use of regulating device DUT to a first connection of an electrochemical energy storage device, for the purposes of simulation is connected instead to, here second, current controller 160 in such a way that first source current IS1 can flow between first supply connection C1 and second connection point 161.

The further supply connection C2 of regulating device DUT, which is to be connected preferably in the later provided "real" use of regulating device DUT to a second connection of an electrochemical energy storage device, for the purposes of simulation is connected instead to the further, here third, current controller 170 in such a way that second source current IS2 can flow between the further supply connection C2 and third connection point 171.

It is evident from the description and the schematic illustration of the preferably identical embodiments of current controller 150, 160, 170, 180, 190 that both the values of the currents IS1, IS2, IL1, IL2, IL3, each output by the current controller, and also their current direction can be set by the model code.

Preferably, currents IS1, IS2, IL1, IL2, IL3, each output by current controller 150, 160, 170, 180, 190 to regulating device DUT, and the voltages present at load connections W1, W2, W3 and supply connections C1, C2 are tested against a reference potential in each model sample interval by the measured values 156, 166, 176, 186, 196, associated with the current controller, at the associated measuring points 158, 168, 178, 188, 198. The measuring points 158, 168, 178, 188, 198 of the particular current controller 150, 160, 170, 180, 190, which points are preferably provided and set up for the voltage measurement against a reference potential and for current measurement of IS1, IS2, IL1, IL2, IL3, according to the embodiment illustrated in FIG. 3, are each assigned a connection from the group comprising supply connections C1, C2 and load connections W1, W2, W3 of regulating device DUT.

In a refinement of the simulation apparatus of the invention, the simulated peripheral circuit arrangement comprises both a simulated copy, associated with first current controller 150, of a first inductive load and also a simulated copy, associated with second current controller 160, of an electrochemical energy storage device, whereby a connection for providing a positive supply voltage Vp+ is connected both to first current controller 150 and also to second current controller 160, and a connection for providing a negative supply voltage Vp− is connected both to first current controller 150 and also to second current controller 160.

In this embodiment, the same simulation apparatus 100 comprises the simulated inductive load and the simulated electrochemical energy storage device.

The inductive load is simulated, for example, in that first current controller 150 provides a first load current IL1, which is calculated by the model code, executed in computation unit CU, in each model sampling interval, at first load connection W1 of regulating device DUT.

Inductive loads in the context of the present invention are understood to be, for example, electromagnets, inductors, or electric motors. In the case of inductive loads, in contrast to so-called "purely resistive loads," the inductive resistances are not negligible and usually must be used in particular for calculating the particular current-time characteristics, for example, by means of the associated model code.

The electrochemical energy storage device is simulated, for example, in that second current controller 160 provides a first source current IS1, which is calculated by the model code, executed in computation unit CU, in each model sampling interval, at first load connection W1 of regulating device DUT.

An at least proportional recovery of first load current IL1 from first source current IL1 or an at least proportional recovery of first source current IL1 from first load current IL1 is made possible via the aforementioned electrical connection of the connections for a positive supply voltage Vp+ or the aforementioned electrical connection of the connections for the negative supply voltage Vp−.

A combination of the simulation of both the inductive load and also the simulation of the electrochemical energy storage device within simulation apparatus 100 is advantageous in particular because in many practical simulation scenarios for testing a regulating device DUT in its simulated technical environments, first load current IL1 and first source current IS1 are matched in terms of magnitude. For this reason, the described type of "recycling" or the recovery of the electrical energy, either from first current controller 150 for second current controller 160 or vice versa, by means of the invention can signify an operating cost advantage compared with a solution from the prior art.

According to a further embodiment of the simulation apparatus of the invention, first current controller 150 and second current controller 160 have an identical structure.

An advantage of the identical structure of first current controller 150 and of second current controller 160 is that the generation of the model code and a model parameterization are facilitated, because in an additional identity, environmental conditions and setpoints for both current controller 150, 160, an identity of the outgoing currents, therefore, for example, of first load current IL1 and first source current IS1 is to be assumed, provided, for example, temperature-related deviations or component tolerances are negligible.

In addition, an identity of first current controller 150 and of second current controller 160 facilitate their production, maintenance, and repair.

According to a further refinement of simulation apparatus 100, first current controller (150) and second current controller (160) can be influenced synchronously in such a way that in an N-fold sequence, following successively in time, of model sampling intervals in each model sampling interval of the N-fold sequence, the first load current (IL1) is changed as a function of the first source current (IS1) or the first source current (IS1) as a function of the first load current (IL1). The described synchronization and the described dependence of first load current IL1 on first source current IS1 or the dependence of first source current IS1 on first load current IL1 are preferably embedded in the model code, for example, in that the calculation of the setpoint for influencing first current controller 150 includes a characteristic of second current controller 160, for example, a setpoint of second current controller 160 or a second measured value 166. In the refinement of simulation apparatus 100, the described synchronization and the described dependence of first load current IL1 on first source current IS1 or the dependence of first source current IS1 on first load current IL1 are produced over N model sampling intervals, whereby N is an integer that is at least 2. Therefore, N is equal to or greater than 2. An advantage of the refinement of the invention is an increase in accuracy according to the model code specifications, during the setting of first load current IL1 and/or first source current IS1, in comparison with the accuracy, which is to be determined without the described synchronization and the described dependence of first load current IL1 on first source current IS1 or the dependence of first source current IS1 on first load current IL1.

A particularly preferred embodiment of the simulation apparatus of the invention has at least one further current controller 170, 180, 190, which is made identical to first current controller (150) and/or to second current controller (160).

An example of an embodiment of this kind is shown in FIG. 3, whereby this example is suitable for simulating an electrochemical energy storage device and a three-phase motor. The simulation apparatus 100 shown in FIG. 3 has: a further, here third, current controller 170, whose third connection point 171 is connected to the further supply connection C2 preferably via third coil L3; a further, here fourth, current controller 180, whose fourth connection point 181 is connected to the further, here second, load connection W2 preferably via fourth coil L4; a further, here fifth, current controller 190, whose fifth connection point 191 is connected to the further, here third, load connection W3 preferably via fifth coil L5.

The further, here third, current controller 170 is used in the simulation, for example, to impress a second source current IS2 onto a further supply connection C2 of the regulating device, by which in conjunction with second current controller 160 it is made possible to reproduce the currents to be simulated of an electrochemical energy storage device at first supply connection C1 and the further supply connection C2 in both current directions. Advantageously, apart from an operating mode, in which the simulated electrochemical energy storage device supplies the simulated inductive load with electrical energy, a different operating mode as well, in which, for example, a so-called recuperation having a return feed of electric energy occurs from the simulation inductive load to the electrochemical energy storage device, can be simulated by this. One of the advantages of the identical structure of the or the further current controller 170, 180, 190 in comparison with first current controller 150 and/or with second current controller 160 can be seen in the fact that the generation and/or parameterization of the model code are simplified.

In a further advantageous embodiment of simulation apparatus 100, the further current controller 170, 180, 190 is electrically connected to a further load connection W2, W3 or to a further supply connection C2. Whether a further or a number of further current controller 170, 180, 190 can be used advantageously in simulation apparatus 100 depends primarily on how many current-carrying, in particular power electronic, load connections W1, W2, W3 and/or supply connections C1, C2 of regulating device DUT are to be connected in sum to simulation apparatus 100.

For example, many conceivable simulation scenarios, in which a simulated DC motor with only a single simulated motor winding, which is routed from first load connection W1 to the reference potential (for example, the ground potential), and a simulated electrochemical energy storage device whose first electrode is connected to first supply connection C1 and its second electrode to the reference potential (for example, ground potential) are to be reproduced, can be executed with a simulation apparatus 100, which has a first current controller 150 for providing a first load current IL1 for a first load connection W1 and a second current controller 160 for providing a first source current IS1 for a first supply connection C1.

A simulation apparatus 100, which in contrast is provided to reproduce both a three-phase electric motor and also an electrochemical energy storage device within the scope of a simulation, whereby load currents IL1, IL2, IL3, therefore, for example, the three phase currents of the three-phase electric motor and the two source currents IS1, IS2, therefore, for example, the currents across two battery electrodes advantageously can each be influenced individually, is preferably equipped with a total of five current controller 150, 160, 170, 180, 190, as shown in FIG. 3.

In a further embodiment of simulation apparatus 100, first current controller 150 or second current controller 160 can be or is connected in parallel to the further current controller 170, 180, 190. This embodiment has the advantage that in a simulation apparatus 100, for example, an exceptionally high load current IL1, IL2, IL3 or an exceptionally high source current IS1, IS2 can be provided, which can be impressed, for example, on a supply connection C1, C2 or a load connection W1, W2, although the exceptionally high load current IL1, IL2, IL3 or the exceptionally high source current IS1, IS2 would not be depictable in an exemplary embodiment of the simulation apparatus of only one single current controller 150, 160, 170, 180, 190. In such case, a current addition of the parallel-connected current controller, therefore, for example, of first current controller 150, connected parallel to the further current controller 170, or of second current controller 160, connected parallel to the further current controller 180, is a means to achieve, for example, a maximum value of a load current IL1, IL2, IL3 or a source current IS1, IS2.

The last embodiment of a simulation apparatus 100 preferably has a switching matrix and the switching matrix is provided and set up to produce a parallel connection of first current controller 150 or of second current controller 160 to the further current controller 170, 180, 190.

The advantage of this embodiment of a simulation apparatus 100 includes in particular in that this parallel connection can be both established and removed flexibly, and in so-called real-time, therefore, for example, the original state, which had existed before the parallel connection was made, can then be restored again. If the switch of the switching matrix have appropriately specified switching times, it is made possible, for example, in a model sampling interval to create one of the aforementioned parallel connections for the purpose of a selective current increase at a load connection W1, W2, W3 or at a supply connection C1, C2 and in an immediately following model sampling interval to again break the parallel connection, mentioned last, for example, for the purpose of a "uniform" association of current controller 150, 160, 170, 180, 190 with load and supply connections C1, C2, W1, W2, W3.

According to a further embodiment of simulation apparatus 100 of the invention, the apparatus is provided and set up for simulating an electric motor connected to regulating device DUT.

The simulation of an electric motor occurs preferably in that at load connection(s) W1, W2, W3 of regulating device DUT, load current(s) IL1, IL2, IL3, calculated via the model code and associated with load connection(s) W1, W2, W3, is/are set by current controller 150, 180, 190 associated by load connection(s) W1, W2, W3. Load current(s) IL1, IL2, IL3 are replicated to the "real" load currents by the model code in that load current(s) IL1, IL2, IL3 correspond(s) in each case to the particular electric motor-winding current(s) that would flow in a real electric motor, if the electric motor-winding current(s) was/were to be provided by regulating device DUT. One of the advantages of this embodiment of simulation apparatus 100 is that in each case a different electric motor can be simulated virtually at the push of a button by a replacement of the model code.

In a preferred refinement of simulation apparatus 100, feeding of currents out of simulation apparatus 100 to a line voltage connection 500 is prevented or substantially prevented. Regardless whether, for example, line voltage connection 500 is a connection to a public three-phase network or a single-phase network, because of the prevention of the last-mentioned return feed, a cost advantage for the acquisition and operation of a simulation apparatus 100 can be achieved, if a long-known simulation apparatus with a notable return feed to a public power grid were to be used for a cost comparison, because such a return feed is typically subject to strict requirements of the power supply companies, which provide the public power supply grid. In particular in regard to the frequency, phase position, and voltage amplitudes, a compatibility of the return feed current with the public power supply grid must be assured, which if necessary would require high additional investments, if the indicated return feed from the simulation apparatus is not prevented or at least kept under an allowable maximum limit.

In a preferred embodiment of simulation apparatus 100, the model code is set up to initiate a change in both first load current IL1 and first source current IS1 in the same model sampling interval. The advantage of initiating the change in both first load current IL1 and first source current IS1 in the same model sampling interval is that a realistic reproduction of first load current IL1 and first source current IS1 is made possible.

In an embodiment, computation unit CU of simulation apparatus 100 comprises a microprocessor and/or an FPGA, whereby the microprocessor and/or the FPGA are provided for controlling first current controller 150 and/or second current controller 160. It is particularly preferred, if model code parts that change relatively often and are relatively not problematic in terms of time are calculated in the microprocessor and the model code parts that change relatively less often and are problematic in terms of time are executed in the FPGA. Dividing the model code execution between a microprocessor and an FPGA offers an advantageous utilization of the strengths of the microprocessor, on the one hand, namely, in particular its flexibility in implementing model code changes, and of the FPGA, on the other, in particular its especially high speed in executing basic logic functions and the especially good support of a parallel processing of the basic logic functions.

It is provided in a further preferred embodiment of simulation apparatus 100 of the invention that first current controller 150 and/or second current controller 160 each have a power FET or a silicon carbide FET.

Particularly preferably, first semiconductor switch 153, second semiconductor switch 154, third semiconductor switch 163, and fourth semiconductor switch 164 are configured as power field-effect transistors, abbreviated as power FETs, or as silicon carbide field-effect transistors, abbreviated as silicon carbide FETs. Comparison tests with different switches, in particular different semiconductor switches, show that a simulation apparatus 100 of the inventive type provides especially reliably and especially realistically a source current IS1, IS2 and/or a load current IL1, IL2, IL3, if power FETs or silicon carbide FETs are provided as semiconductor switches for controlling, on the one hand, first and/or second source current IS1 and/or IS2 and/or, on the other, first and/or second and/or third load current IL1 and/or IL2 and/or IL3 in simulation apparatus 100.

It is provided in a preferred embodiment of the method of the invention that within an m-th model sampling interval the model code has a changing effect both on first current controller 150 and also on second current controller 160, and both first load current IL1 and also first source current IS1 are changed thereby within the m-th model sampling interval.

The already described preferred synchronization and the preferred mutual dependence of a change in first load current IL1 and first source current IS1, as already described, are embedded preferably in the model code, for example, in that in the m-th model sampling interval the calculation of the setpoint for influencing first current controller 150 includes a characteristic of second current controller 160, for example, a setpoint of second current controller 160 or a second measured value 166. The last-mentioned embodiment of the method of the invention is especially advantageous, because an increase in accuracy and realism according to the model code specifications can be achieved thereby, during the setting of first load current IL1 and/or first source current IS1, in comparison with an accuracy and realism, which can be established without the described synchronization and mutual dependence of the change in first load current IL1 and/or first source current IS1.

In an embodiment of the method, in the m-th model sampling interval an output of first current controller 150 or an output of second current controller 160 are connected in parallel to an output of at least one further current controller 170, 180, 190.

An advantage of this embodiment of the method is that in a simulation apparatus 100 within the m-th model sampling interval, for example, an exceptionally high load current IL1, IL2, IL3 or an exceptionally high source current IS1, IS2 can be provided, which can be supplied, for example, to a supply connection C1, C2 or a load connection W1, W2, W3.

The term "parallel connection" of two current controllers can mean that the outputs of the two current controllers are connected together for a predefined or calculated time period and a sum current is thereby available.

The parallel connection of two current controllers can be explained even more clearly in the following example: it is provided in this example to connect in parallel first current controller 150 with a further, here fourth, current controller 180. To this end, the outputs of these two current controllers 150 and 180 are connected; therefore consequently the sum of first load current IL1 and of second load current IL2 is formed. The sum current=IL1+IL2 produced thereby in this example is connected to a first load connection W1 or to a second load connection W2 by means of a switching matrix (not shown). This example ends here.

A current addition by means of a parallel connection of first current controller 150 or second current controller 160 with a further current controller 170, 180, 190 advantageously makes it possible within the appropriate m-th model sampling interval to achieve a higher maximum value of a load current IL1, IL2, IL3 or a source current IS1, IS2 than without the indicated parallel connection. Of course, the refinement of the method can be used in a number of model sampling intervals.

It is provided in a further preferred refinement of the method of the invention that by means of the model code executed in computation unit CU both a first setpoint for influencing first current controller 150 is calculated as a function of a first measured value 156, measured at a first load connection W1 of regulating device DUT, and a second setpoint for influencing second current controller 160 is calculated as a function of a second measured value 166, measured at a first supply connection C1 of regulating device DUT, and subsequently first load current IL1, provided by first current controller 150 and influenced by the first setpoint, is updated at a first load connection W1 of regulating device DUT, and first source current IS1, provided by second current controller 160 and influenced by the second setpoint, is updated at a first supply connection C1 of regulating device DUT.

The consideration described here of first measured value 156 and second measured value 166 by the model code advantageously leads to an improved computability of the first and second setpoint and thereby to a relatively rapid and exact provision of first load current IL1 and of first source current IS1, therefore finally to an especially realistic simulation of the peripheral circuit arrangement of regulating device DUT.

The method of the invention and the refinements of the method of the invention are carried out particularly preferably by a simulation apparatus 100 of the invention or by a refinement of simulation apparatus 100 of the invention. The cited advantages of the method of the invention and the device of the invention and the embodiments and refinements thereof can be combined because of this.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A simulation apparatus for simulating a peripheral circuit arrangement adapted to be connected to a regulating device, the simulation apparatus being adapted to be connected electrically to the regulating device, the simulation apparatus comprising:
    a first current controller adapted to influence a first load current;
    a second current controller adapted to influence a first source current;
    a computation unit; and
    a model code executable in the computation unit,
    wherein the first load current is set by the first current controller, which is controllable by the model code, the first load current being routed to a first load connection of the regulating device,
    wherein the first source current is set by the second current controller, which is controllable by the model code,
    wherein the first source current is routed to a first supply connection of the regulating device, and
    wherein the model code influences the first current controller and the second current controller such that the first load current is recoverable at least proportionally from the first source current, and/or such that the first source current is recoverable at least proportionally from the first load current.

2. The simulation apparatus according to claim 1, wherein the peripheral circuit arrangement that is simulated comprises:
    a simulated copy associated with the first current controller of a first inductive load; and
    a simulated copy associated with the second current controller of an electrochemical energy storage device,
    wherein a connection for providing a positive supply voltage is connected to the first current controller and to the second current controller, and
    wherein a connection for providing a negative supply voltage is connected to the first current controller and also to the second current controller.

3. The simulation apparatus according to claim 1, wherein the first current controller and the second current controller have a substantially identical structure.

4. The simulation apparatus according to claim 1, wherein the first current controller and the second current controller are adapted to be influenced synchronously such that in an N-fold sequence, following sequentially in time, of model sampling intervals in each model sampling interval of the N-fold sequence, the first load current is changed as a function of the first source current or the first source current is changed as a function of the first load current.

5. The simulation apparatus according to claim 1, wherein the simulation apparatus has a third current controller, which has a substantially identical structure to the first current controller and/or to the second current controller.

6. The simulation apparatus according to claim 5, wherein the third current controller is electrically connected to a further load connection or to a further supply connection.

7. The simulation apparatus according to claim 5, wherein the first current controller or the second current controller are connectable in parallel to the third current controller.

8. The simulation apparatus according to claim 7, wherein the simulation apparatus has a switching matrix that creates a parallel connection of the first current controller or the second current controller to the third current controller.

9. The simulation apparatus according to claim 1, wherein the simulation apparatus simulates an electric motor connected to the regulating device.

10. The simulation apparatus according to claim 1, wherein a return feed of currents from the simulation apparatus to a line voltage connection is prevented or substantially prevented.

11. The simulation apparatus according to claim 1, wherein the model code initiates a change in the first load current and the first source current in the same model sampling interval.

12. The simulation apparatus according to claim 1, wherein the computation unit comprises a microprocessor and/or an FPGA, and wherein the microprocessor and/or the FPGA are provided for controlling the first current controller and/or the second current controller.

13. The simulation apparatus according to claim 1, wherein the first current controller and/or the second current controller each has or have a power FET or a silicon carbide FET.

14. A method for simulating a peripheral circuit arrangement connectable to a regulating device, the method comprising:
    electrically connecting the regulating device to a simulation apparatus for simulating the peripheral circuit arrangement;
    influencing, via a first current controller, a first load current flowing through a first load connection of the regulating device;
    influencing, via a second current controller, a first source current flowing through a first supply connection of the regulating device;
    executing a model code in a computation unit;
    setting the first load current by the model code and by the first current controller controlled by the model code;
    setting the first source current by the model code and by the second current controller controlled by the model code;
    wherein the model code sets the first current controller and the second current controller such that the first load current is recovered at least proportionally from the first source current and/or the first source current is recovered at least proportionally from the first load current.

15. The method according to claim 14, wherein, within an m-th model sampling interval, the model code has a changing effect on the first current controller and on the second current controller, and wherein the first load current and also the first source current are changed thereby within the m-th model sampling interval.

16. The method according to claim 15, wherein, in the m-th model sampling interval an output of first current controller or an output of second current controller are connected in parallel to an output of at least one further current controller.

17. The method according to claim 14, wherein, via the model code executed in the computation unit:
- a first setpoint for influencing the first current controller is calculated as a function of a first measured value, measured at a first load connection of a regulating device,
- a second setpoint for influencing second current controller is calculated as a function of a second measured value, measured at a first supply connection of the regulating device,
- wherein the first load current provided by the first current controller and influenced by the first setpoint, is updated at a first load connection of the regulating device, and
- wherein the first source current provided by the second current controller and influenced by the second setpoint, is updated at a first supply connection of the regulating device.

18. The method according to claim 14, wherein the method is carried out by a simulation apparatus comprising:
- a first current controller adapted to influence a first load current;
- a second current controller adapted to influence a first source current;
- a computation unit; and
- a model code executable in the computation unit,
- wherein the first load current is set by the first current controller, which is controllable by the model code, the first load current being routed to a first load connection of the regulating device,
- wherein the first source current is set by the second current controller, which is controllable by the model code,
- wherein the first source current is routed to a first supply connection of the regulating device, and
- wherein the model code influences the first current controller and the second current controller such that the first load current is recoverable at least proportionally from the first source current, and/or such that the first source current is recoverable at least proportionally from the first load current.

* * * * *